United States Patent
Hashiga et al.

(10) Patent No.: US 11,699,918 B2
(45) Date of Patent: Jul. 11, 2023

(54) POWER SUPPLY SWITCHING APPARATUS

(71) Applicants: Sumitomo Wiring Systems, Ltd., Yokkaichi (JP); AutoNetworks Technologies, Ltd., Yokkaichi (JP); Sumitomo Electric Industries, Ltd., Osaka (JP)

(72) Inventors: Ryota Hashiga, Yokkaichi (JP); Masahiko Furuichi, Yokkaichi (JP); Kenichi Iwata, Yokkaichi (JP); Hikaru Suzuki, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/656,458

(22) Filed: Mar. 25, 2022

(65) Prior Publication Data
US 2022/0311270 A1 Sep. 29, 2022

(30) Foreign Application Priority Data
Mar. 26, 2021 (JP) ................................ 2021-052500

(51) Int. Cl.
*H02J 9/06* (2006.01)
*B60R 16/033* (2006.01)
*H02J 7/00* (2006.01)
*H02J 1/10* (2006.01)

(52) U.S. Cl.
CPC ............ *H02J 9/061* (2013.01); *B60R 16/033* (2013.01); *H02J 1/108* (2013.01); *H02J 7/0024* (2013.01); *H02J 7/0063* (2013.01); *H02J 2310/40* (2020.01)

(58) Field of Classification Search
CPC ........... H02J 1/108; H02J 9/061; B60R 16/03; B60R 16/033
See application file for complete search history.

(56) References Cited

U.S. PATENT DOCUMENTS

| 2005/0035656 | A1* | 2/2005 | Kuramochi | ........... H02J 7/1423 307/10.1 |
| 2014/0081520 | A1 | 3/2014 | Sugimoto | |
| 2017/0080883 | A1* | 3/2017 | Yasunori | ........... H02J 7/007182 |

FOREIGN PATENT DOCUMENTS

FR 2850071 A1 * 7/2004 ............. B60R 16/03

* cited by examiner

*Primary Examiner* — Ryan Johnson
(74) *Attorney, Agent, or Firm* — Honigman LLP

(57) ABSTRACT

A power supply switching apparatus includes a first switching unit supplying power from a first conductive path to a first output path when the voltage of the first conductive path is greater than the voltage of a second conductive path, and supplies power from the second conductive path to the first output path. A second switching unit 80 supplies power from a fourth conductive path to a second output path when the voltage of a fourth conductive path is greater than the voltage of a third conductive path, and supplies power from the third conductive path to the second output path. An element unit allows a current to flow from the second conductive path to the third conductive path when the voltage of the third conductive path is smaller than the voltage of the second conductive path, and otherwise blocks a current.

6 Claims, 4 Drawing Sheets

POWER SUPPLY SWITCHING APPARATUS

CROSS-REFERENCE TO RELATED APPLICATIONS

This application claims priority of Japanese Patent Application No. JP 2021-052500 filed on Mar. 26, 2021, the contents of which are incorporated herein.

TECHNICAL FIELD

The present disclosure relates to a power supply switching apparatus.

BACKGROUND

JP 2013-28295A discloses an example of an in-vehicle power supply apparatus. The in-vehicle power supply apparatus disclosed in JP 2013-28295A is an in-vehicle power supply apparatus that supplies power to in-vehicle devices from a secondary battery installed in a vehicle. When a voltage supplied to the in-vehicle devices falls to a first set value or below, a voltage compensation means in this in-vehicle power supply apparatus suppresses and compensates for a drop in the power supply voltage supplied to the in-vehicle device. When the voltage supplied to the in-vehicle devices falls to a second set value, which is smaller than the first set value, or below, an uninterruptible power supply means supplies power from another secondary battery different from the above secondary battery to at least one in-vehicle device.

SUMMARY

While the technology disclosed in JP 2013-28295A is configured to be able to supply power to a plurality of loads based on power from a separate power supply when the supply of power from the main power supply is interrupted, the supply path for power from the separate power supply is not envisioned as being monitored.

The present disclosure provides a technology that can switch a power supply in a power supply system in which power can be supplied from a power supply unit and a power storage unit, and is advantageous in terms of monitoring the supply of power from the power storage unit.

A power supply switching apparatus, which is an aspect of the present disclosure, is a power supply switching apparatus that is used to switch a power supply in a power supply system that includes a power supply unit, a power storage unit, and a power path that is a path for supplying power from the power supply unit. The power supply switching apparatus includes a first conductive path, a second conductive path, a third conductive path, a fourth conductive path, a first output path, a second output path, a first switching unit, a second switching unit and an element unit. The first conductive path is a path for receiving power supplied from the power path. The second conductive path is a path for supplying power that is based on the power storage unit. The third conductive path is a path for supplying power that is based on the power storage unit and is different from the second conductive path. The fourth conductive path is a path for receiving power supplied from the power path. The first output path is a path for supplying power to a first load. The second output path is a path for supplying power to a second load. The first switching unit is configured to supply power from the first conductive path to the first output path when the voltage of the first conductive path is greater than the voltage of the second conductive path, and supply power from the second conductive path to the first output path when the voltage of the first conductive path is smaller than the voltage of the second conductive path; a second switching unit that is configured to supply power from the fourth conductive path to the second output path when the voltage of the fourth conductive path is greater than the voltage of the third conductive path, and supply power from the third conductive path to the second output path when the voltage of the fourth conductive path is smaller than the voltage of the third conductive path. The element unit is configured to allow a current to flow from the second conductive path to the third conductive path in the case of a predetermined state where the voltage of the third conductive path is smaller than the voltage of the second conductive path, and otherwise block a current from flowing from the second conductive path to the third conductive path.

The technology according to the present disclosure can switch a power supply in a power supply system in which power can be supplied from a power supply unit and a power storage unit, and is advantageous in terms of monitoring the supply of power from the power storage unit.

DETAILED DESCRIPTION OF PREFERRED EMBODIMENTS

Figure 1:
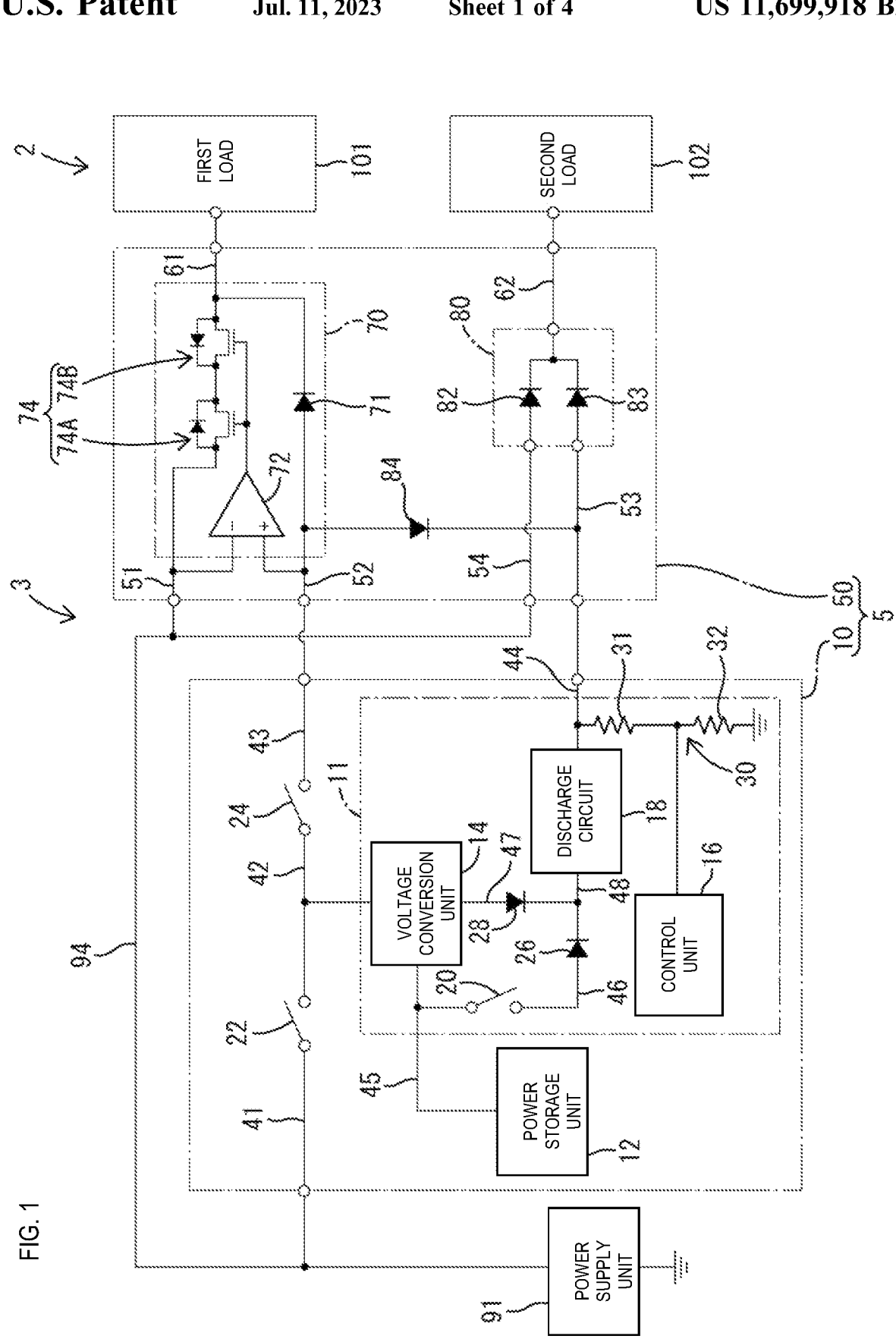
FIG. 1 is a circuit diagram schematically showing an example of an in-vehicle system including a power supply switching apparatus according to a first embodiment.

Embodiments of the present disclosure will be listed and described below. Note that the features of the first through fourth aspects described below may be combined in any manner provided that no contradiction arises.

In a first aspect, a power supply switching apparatus that is used to switch a power supply in a power supply system that includes a power supply unit, a power storage unit, and a power path that is a path for supplying power from the power supply unit. The power supply switching apparatus includes a first conductive path, a second conductive power path, a third conductive power path, a fourth conductive power path, a first output path, a second output path, a first switching unit and an element unit. The first conductive power path is a path for receiving power supplied from the power path. The second conductive path is a path for supplying power that is based on the power storage unit. The third conductive path is a path for supplying power that is based on the power storage unit and is different from the second conductive path. The fourth conductive path is a path for receiving power supplied from the power path. The first output path is a path for supplying power to a first load. The second output path is a path for supplying power to a second load. The first switching unit is configured to supply power from the first conductive path to the first output path at the time of a predetermined first state where the voltage of the first conductive path is greater than the voltage of the second conductive path, and supply power from the second conductive path to the first output path at the time of a predetermined second state where the voltage of the first conductive path is smaller than the voltage of the second conductive path; a second switching unit that is configured to supply power from the fourth conductive path to the second output path at the time of a predetermined third state where the voltage of the fourth conductive path is greater than the voltage of the third conductive path, and supply power from the third conductive path to the second output path at the time of a predetermined fourth state where the voltage of the fourth conductive path is smaller than the voltage of the third conductive path. The element unit is configured to allow a current to flow from the second conductive path to the third conductive path in the case of a predetermined state where the voltage of the third conductive path is smaller than the voltage of the second conductive path, and otherwise block a current from flowing from the second conductive path to the third conductive path.

When power that is to be supplied from the power supply unit via a power path is interrupted, the power supply switching apparatus in the first aspect can supply power to a first load and a second load using power from the power storage unit. Furthermore, in the case of a predetermined state where the voltage of the third conductive path is lower than the voltage of the second conductive path, the power supply switching apparatus in the first aspect allows a current to flow from the second conductive path to the third conductive path, but otherwise blocks a current from flowing from the second conductive path to the third conductive path. That is, whether or not the predetermined state has been entered is reflected in the third conductive path, and thus, if the third conductive path is a monitoring target, the power supply switching apparatus is advantageous in terms of monitoring the supply of power from the power storage unit. The predetermined first state may be a state where the voltage of the first conductive path is greater than the voltage of the second conductive path, or a state where the voltage of the first conductive path is greater than the voltage of the second conductive path by a first predetermined value or more. The predetermined second state may be a state where the voltage of the first conductive path is smaller than the voltage of the second conductive path, or a state where the voltage of the first conductive path is smaller than the voltage of the second conductive path by a second predetermined value or more. The predetermined third state may be a state where the voltage of the fourth conductive path is greater than the voltage of the third conductive path, or a state where the voltage of the fourth conductive path is greater than the voltage of the third conductive path by a third predetermined value or more. The predetermined fourth state may be a state where the voltage of the fourth conductive path is smaller than the voltage of the third conductive path, or a state where the voltage of the fourth conductive path is smaller than the voltage of the third conductive path by a fourth predetermined value or more. If the first predetermined value and the second predetermined value are employed, the first predetermined value and the second predetermined value may be the same value or different values. If the third predetermined value and the fourth predetermined value are employed, the third predetermined value and the fourth predetermined value may be the same value or different values.

In a second aspect, the power supply switching apparatus according to the first aspect has the following features. The first switching unit includes a switch unit, a driving unit, and a blocking unit that is provided with a diode. The switch unit is provided between the first conductive path and the first output path, and allows passage of a current between the first conductive path and the first output path when on, and blocks passage of a current between the first conductive path and the first output path when off. The driving unit turns on the switch unit in a case where the voltage of the first conductive path is greater than the voltage of the second conductive path or in a case where the voltage of the first conductive path is greater than the voltage of the second conductive path by a first predetermined value or more, and turns off the switch unit in a case where the voltage of the first conductive path is smaller than the voltage of the second conductive path or in a case where the voltage of the first conductive path is smaller than the voltage of the second conductive path by a second predetermined value or more. The second conductive path is electrically connected to an anode of the diode of the blocking unit, and the first output path is electrically connected to a cathode of the diode of the blocking unit.

As a result of the power supply switching apparatus in the second aspect turning on the switch unit when the voltage of the first conductive path is relatively greater than the voltage of the second conductive path, power that is based on the power supply unit can be supplied to the first output path while suppressing loss. On the other hand, when the voltage of the first conductive path is relatively smaller than the voltage of the second conductive path, the power supply switching apparatus in the second aspect can immediately supply power that is based on the power storage unit to the first output path via the diode.

In a third aspect, the power supply switching apparatus according to the second aspect has the following features. The second switching unit includes a second diode and a third diode. An anode of the second diode is electrically connected to the fourth conductive path, and a cathode of the second diode is electrically connected to the second output path. An anode of the third diode is electrically connected to the third conductive path, and a cathode of the third diode is electrically connected to the second output path.

The power supply switching apparatus in the third aspect can more easily realize a configuration in which, when the power supply voltage that is based on the power supply unit is relatively high, power can be supplied to the second output path based on the power supply unit, and, when the power supply voltage is relatively low due to a failure or the like, power can be immediately supplied to the second output path based on the power storage unit.

In a fourth aspect, the power supply switching apparatus according to any one of the first through the third aspects has the following features. The power supply switching apparatus further includes a power control apparatus that is configured to control the supply of power from the power storage unit. The power control apparatus performs a first switching operation, a second switching operation, and a detection operation. The first switching operation is an operation of switching between a first supply operation of supplying power that is based on the power storage unit to the second conductive path, and a first stopping operation of stopping the supply of power from the power storage unit to the second conductive path. The second switching operation is an operation of switching between a second supply operation of supplying power that is based on the power storage unit to the third conductive path, and a second stopping operation of stopping the supply of power from the power storage unit to the third conductive path. The detection operation is an operation of detecting the voltage of the third conductive path while the first supply operation and the second stopping operation are being performed.

The power supply switching apparatus in the fourth aspect can output power that is based on the power storage unit to separate paths (the second conductive path and the third conductive path), and can independently switch output to each path. Furthermore, this power supply switching apparatus can use one path (the third conductive path) for both output and monitoring, and confirm whether or not output from the other path (the second conductive path) is being performed appropriately, and thus monitoring as to whether or not the supply of power from the power storage unit is being performed appropriately can be realized with a simpler configuration.

First Embodiment

Overview of In-Vehicle System

FIG. 1 shows an in-vehicle system 2. The in-vehicle system 2 shown in FIG. 1 mainly includes an in-vehicle power supply system 3, a first load 101, and a second load 102. The in-vehicle power supply system 3 is also referred to as the power supply system 3 in the following description. The in-vehicle system 2 is a system that uses the power supply system 3 to supply power to a plurality of loads, and operates the loads. The first load 101 and the second load 102 are illustrated as loads in FIG. 1, but other loads may be provided in the in-vehicle system 2.

The first load 101 is an electric component installed in a vehicle. The first load 101 operates by receiving power supplied thereto via a first output path 61. The type of the first load 101 is not limited. Various known in-vehicle components can be employed as the first load 101. The first load 101 may include a plurality of electric components or be a single electric component.

The second load 102 is an electric component installed in the vehicle. The second load 102 operates by receiving power supplied thereto via a second output path 62. Various known in-vehicle components can be employed as the second load 102. The second load 102 may include a plurality of electric components or be a single electric component. The first load 101 and the second load 102 may be the same type of load or different types of loads.

The power supply system 3 is a system that supplies power to the loads included in the in-vehicle system 2. The power supply system 3 is configured as a system that supplies power to the first load 101 and the second load 102 with a power supply unit 91 or a power storage unit 12 serving as a power supply source. The power supply system 3 can supply power to the first load 101 and the second load 102 from the power supply unit 91, and when the supply of power from the power supply unit 91 is interrupted by a failure or the like, power can be supplied to the first load 101 and the second load 102 from the power storage unit 12.

Overview of Power Supply System

The power supply system 3 includes the power supply unit 91, the power storage unit 12, a power path 94 that is a supply path for power from the power supply unit 91, and a power supply switching apparatus 5.

The power supply unit 91 is an in-vehicle power supply that can supply power to the first load 101 and the second load 102. The power supply unit 91 is configured, for example, as a known in-vehicle battery such as a lead battery. The power supply unit 91 may be configured as a battery other than a lead battery, or may include a non-battery power supply means in place of a battery or in addition to a battery. The positive electrode of the power supply unit 91 is electrically connected to the power path 94, and the negative electrode is electrically grounded. The power supply unit 91 applies a direct current voltage of a fixed value to the power path 94. The voltage applied by the power supply unit 91 to the power path 94 may slightly vary from the fixed value.

The power storage unit 12 is a power supply that acts as a power supply source at least when the supply of power from the power supply unit 91 is interrupted. The power storage unit 12 is, for example, configured by a known power storage means such as an electric double layered capacitor (EDLC). The power storage unit 12 may be configured by a capacitor other than an electric double layered capacitor, or may include another power storage means (such as a battery) in place of the capacitor or in addition to the capacitor. The positive electrode of the power storage unit 12 is electrically connected to a conductive path 45, and the negative electrode is electrically grounded. The output voltage of the power storage unit 12 (the voltage applied to the conductive path 45 by the power storage unit 12) may be greater or smaller than the output voltage of the power supply unit 91 (the voltage applied to the power path 94 by the power supply unit 91).

In the present specification, the voltages are voltages relative to a ground potential (for example, 0 V), unless specifically stated otherwise, and are potential differences from the ground potential. For example, the voltage applied to the power path 94 is the potential difference between the potential of the power path 94 and the ground potential.

The power path 94 is a path on which power that is based on the power supply unit 91 is transmitted. In the example shown in FIG. 1, the power path 94 is a path to which the output voltage of the power supply unit 91 is applied. The power path 94 is electrically connected to a first conductive path 51 and a fourth conductive path 54. A relay or a switch may be provided on the power path 94, and the power path 94 may be configured so that passage of a current can be blocked by the relay or switch.

Configuration of Power Supply Switching Apparatus

The power supply switching apparatus 5 is an apparatus used to switch the power supply in the power supply system 3. The power supply switching apparatus 5 mainly includes a first apparatus 10 and a second apparatus 50.

The first apparatus 10 is a backup apparatus that can output power that is based on the power storage unit 12. The first apparatus 10 includes the power storage unit 12, switches 20, 22, and 24, a power control apparatus 11, and conductive paths 41, 42, 43, 44, and 45. The first apparatus 10 can output power that is based on the power storage unit 12 to a second conductive path 52 and a third conductive path 53.

The power control apparatus 11 is an apparatus that controls the supply of power from the power storage unit 12. The power control apparatus 11 includes a voltage conversion circuit 14, a control unit 16, a discharge circuit 18, diodes 26 and 28, conductive paths 46, 47, and 48, a voltage detection unit 30, and the like.

The voltage conversion circuit 14 is configured, for example, by a DC/DC converter or the like. The voltage conversion circuit 14 can perform a first conversion operation of stepping down or stepping up the direct current voltage applied to the conductive path 42, and applying the resulting voltage as an output voltage to the conductive path 45. For example, as a result of the voltage conversion circuit 14 performing the first conversion operation when the switch 22 is on, a charging current that is based on power from the power supply unit 91 is supplied to the power storage unit 12. The voltage conversion circuit 14 can perform a second conversion operation of stepping down or stepping up a direct current voltage applied to the conductive path 45, and applying the resulting voltage as an output voltage to the conductive paths 42 and 47. For example, as a result of the voltage conversion circuit 14 performing the second conversion operation when the switch 22 is off and the switch 24 is on, a direct current voltage that is based on power from the power storage unit 12 is applied to the conductive paths 42 and 43 and the second conductive path 52. The operations of the voltage conversion circuit 14 are controlled by the control unit 16.

The discharge circuit 18 is provided between the conductive path 48 and the conductive path 44, and can perform a discharge operation of supplying a discharge current to the conductive path 44 based on the voltage applied to the conductive path 48, and a stopping operation of stopping this discharge operation. The discharge circuit 18 may be constituted by a switch that can switch a state between the conductive path 48 and the conductive path 44 between a conductive state and a non-conductive state, or by a DC/DC converter. As a result of the discharge circuit 18 performing a discharge operation when the switch 20 is on or when the voltage conversion circuit 14 is applying an output voltage to the conductive path 47, a direct current voltage that is based on power from the power storage unit 12 is applied to the conductive path 44 and the third conductive path 53.

The conductive path 45 is a conductive path that is electrically connected to the positive electrode of the power storage unit 12. For example, the conductive path 45 is short-circuited so that the potential thereof is the same as the potential of the positive electrode of the power storage unit 12. The switch 20 is an element that switches the state between the conductive path 45 and the conductive path 46 between a conductive state (short-circuited state) and a non-conductive state (blocked state). The conductive path 46 is a conductive path that short circuits one end of the switch 20 and the anode of the diode 26. The diode 26 is an element in which the anode thereof is electrically connected to the conductive path 46 and the cathode thereof is electrically connected to the conductive path 48. The switch 20 is an element that switches the state between the conductive path 45 and the conductive path 46 between a conductive state and a non-conductive state. When the switch 20 is on, an output voltage of the power storage unit 12 is applied to the anode of the diode 26, and the anode of the diode 26 and the positive electrode of the power storage unit 12 attain the same potential. When the switch 20 is off, the conductive path 45 and the conductive path 46 are electrically separated, and passage of a current between the conductive path 45 and the conductive path 46 is blocked.

The conductive path 47 is a conductive path that can function as an output path extending from the voltage conversion circuit 14. The diode 28 is an element in which the anode thereof is electrically connected to the conductive path 47, and the cathode thereof is electrically connected to the conductive path 48. The conductive path 48 is a conductive path that is electrically connected to one end of the discharge circuit 18.

The conductive path 41 is a conductive path that is electrically connected to the power path 94. The potential of the conductive path 41 is the same as the potential of the power path 94. The conductive path 43 is a conductive path that is electrically connected to the second conductive path 52. The potential of the conductive path 43 is the same as the potential of the second conductive path 52. The conductive path 42 is a conductive path that is interposed between the conductive path 41 and the conductive path 43. The conductive path 42 has the same or substantially the same potential as the potential of the conductive path 41 when the switch 22 is on. The conductive path 42 has the same or substantially the same potential as the potential of the conductive path 43 when the switch 24 is on. The conductive path 42 is electrically connected to one end of the voltage conversion circuit 14, and is an input-side conductive path during the first conversion operation and is an output-side conductive path during the second conversion operation.

Note that the switches 20, 22, and 24 may be semiconductor switches such as FETs, or mechanical relay switches.

The control unit 16 is an information processing apparatus that includes an information processing function, a computational function, a control function, and the like. The control unit 16 also functions as a computational processing unit. The control unit 16 can perform a first control that causes the voltage conversion circuit 14 to perform the first conversion operation and a second control that causes the voltage conversion circuit 14 to perform the second conversion operation. The control unit 16 performs a third control that causes the discharge circuit 18 to perform the discharge operation, and a fourth control that causes the discharge circuit 18 to perform the stopping operation.

The voltage detection unit 30 is a circuit that outputs an analog voltage value that is a value with which the value of the voltage applied to the third conductive path 53 can be specified. The voltage detection unit 30 may be a circuit that inputs the same voltage value as the value of the voltage applied to the third conductive path 53 to the control unit 16, or a circuit that inputs a value in proportion to the value of the voltage applied to the third conductive path 53 to the control unit 16. In the example shown in FIG. 1, the voltage detection unit 30 is a voltage divider that is realized by resistors 31 and 32, and a value obtained by using the voltage divider to divide the value of the voltage applied to the third conductive path 53 is input to the control unit 16 as a detection value.

The second apparatus 50 is an apparatus that switches between power that is based on the power supply unit 91 or power that is based on the power storage unit 12 being supplied to the first load 101. The second apparatus 50 is also an apparatus that switches between power that is based on the power supply unit 91 or power that is based on the power storage unit 12 being supplied to the second load 102.

The second apparatus 50 includes the first conductive path 51, the second conductive path 52, the third conductive path 53, the fourth conductive path 54, the first output path 61, the second output path 62, a first switching unit 70, a second switching unit 80, and a fourth diode 84.

The first conductive path 51 is a path that is supplied with power from the power path 94. The first conductive path 51 is electrically connected to the power path 94. The potential of the first conductive path 51 is the same as the potential of the power path 94.

The second conductive path 52 is a path for supplying power that is based on the power storage unit 12. The second conductive path 52 is electrically connected to the conductive path 43. The potential of the second conductive path 52 is the same as the potential of the conductive path 43. When the switch 24 is on, the potential of the second conductive path 52 is the same or substantially the same as the potential of the conductive path 42.

The third conductive path 53 is a path for supplying power that is based on the power storage unit 12, and is different from the second conductive path 52. The third conductive path 53 is electrically connected to the conductive path 44. The potential of the third conductive path 53 is the same as the potential of the conductive path 44.

The first output path 61 is a path for supplying power to the first load 101. The first output path 61 is electrically connected to the first load 101. For example, the voltage applied to the first output path 61 is applied to one end of the first load 101.

The second output path 62 is a path for supplying power to the second load 102. The second output path 62 is electrically connected to the second load 102. For example, the voltage applied to the second output path 62 is applied to one end of the second load 102.

The fourth diode 84 corresponds to an example of an element unit. The anode of the fourth diode 84 is electrically connected to the second conductive path 52 and the cathode of the same is electrically connected to the third conductive path 53. The potential of the anode of the fourth diode 84 is the same as the potential of the second conductive path 52. The potential of the cathode of the fourth diode 84 is the same as the potential of the third conductive path 53. In the case of a predetermined state where the voltage of the third conductive path 53 is lower than the voltage of the second conductive path 52, the fourth diode 84 allows a current to flow from the second conductive path 52 to the third conductive path 53, and otherwise blocks a current from flowing from the second conductive path 52 to the third conductive path 53. Specifically, if the potential of the second conductive path 52 is of a magnitude exceeding the forward voltage Vf of the fourth diode 84 relative to the potential of the third conductive path 53, a current flows from the second conductive path 52 to the third conductive path 53, but otherwise no current flows from the second conductive path 52 to the third conductive path 53.

The first switching unit 70 is a circuit that switches the power supply for supplying power to the first output path 61. The first switching unit 70 includes a switch unit 74, a comparator circuit 72 that corresponds to an example of a driving unit, and the first diode 71 that corresponds to an example of a blocking unit.

The comparator circuit 72 (driving unit) is a circuit that turns on the switch unit 74 when the voltage of the first conductive path 51 is greater than the voltage of the second conductive path 52 or greater than or equal to a first predetermined value, and turns off the switch unit 74 when the voltage of the first conductive path 51 is smaller than the voltage of the second conductive path 52 or smaller than or equal to a second predetermined value. The comparator circuit 72 is configured as a hysteresis comparator, for example. If the first predetermined value and the second predetermined value are employed, the first predetermined value and the second predetermined value may be the same value or different values. The first predetermined value and the second predetermined value may be 0 or a positive value. If, for example, the voltage of the first conductive path 51 is greater than the voltage of the second conductive path 52 by the first predetermined value or more, the comparator circuit 72 outputs an L-level voltage signal. If the voltage of the first conductive path 51 switches to being smaller than the voltage of the second conductive path 52 in a state where the comparator circuit 72 is outputting the L-level voltage signal, the comparator circuit 72 switches to outputting a H-level voltage signal. In this case, the first predetermined value is a positive value that is greater than 0 and smaller than the voltage of the first conductive path 51 and the voltage of the second conductive path 52. If the voltage of the first conductive path 51 switches to being greater than the voltage of the second conductive path 52 by the first predetermined value in a state where the comparator circuit 72 is outputting the H-level voltage signal, the comparator circuit 72 switches to outputting the L-level voltage signal. The L-level voltage signal is a signal that instructs the switch unit 74 to turn on. The H-level voltage signal is a signal that instructs the switch unit 74 to turn off.

Note that the comparator circuit 72 may be configured as a separately configured hysteresis computer. For example, the comparator circuit 72 may operate so as to turn on the switch unit 74 when the voltage of the first conductive path 51 is greater than the voltage of the second conductive path 52, and turn off the switch unit 74 when the voltage of the first conductive path 51 is smaller than the voltage of the second conductive path 52 by the second predetermined value or more. For example, a configuration is possible where, if the voltage of the first conductive path 51 is greater than the voltage of the second conductive path 52, the comparator circuit 72 outputs an L-level voltage signal, and, if the voltage of the first conductive path 51 switches to being smaller than the voltage of the second conductive path 52 by the second predetermined value or more while the L-level voltage signal is being output, the comparator circuit 72 switches to a state of outputting a H-level voltage signal, and, if the voltage of the first conductive path 51 switches to being greater than the voltage of the second conductive path 52 while the H-level voltage signal is being output, the comparator circuit 72 switches to a state of outputting an L-level voltage signal. Alternatively, the comparator circuit 72 may be configured as an ordinary comparator, in which case, the L-level voltage signal can be output and the switch unit 74 can be turned on when the voltage of the first conductive path 51 is greater than the voltage of the second conductive path 52, and the H-level voltage signal can be output and the switch unit 74 can be turned off when the voltage of the first conductive path 51 is smaller than the voltage of the second conductive path 52.

The switch unit 74 is provided between the first conductive path 51 and the first output path 61, and allows passage of a current between the first conductive path 51 and the first output path 61 when on, and blocks passage of a current between the first conductive path 51 and the first output path 61 when off. The switch unit 74 includes a pair of FETs 74A and 74B that are disposed facing opposite directions and connected in series. The FETs 74A and 74B are, for example, configured as P-channel FETs (Field Effect Transistors). When the H-level voltage signal is being output from the comparator circuit 72, the switch unit 74 turns off both FETs 74A and 74B, and blocks bilateral passage of a current between the first conductive path 51 and the first output path 61. When the L-level voltage signal is being output from the comparator circuit 72, the switch unit 74 turns on both FETs 74A and 74B, and allows bilateral passage of a current between the first conductive path 51 and the first output path 61.

The second conductive path 52 is electrically connected to the anode of the first diode 71 (blocking unit), and the first output path 61 is electrically connected to the cathode of the first diode 71. The potential of the anode of the first diode 71 is the same as the potential of the second conductive path 52. The potential of the cathode of the first diode 71 is the same as the potential of the first output path 61. If the potential of the second conductive path 52 is of a magnitude exceeding the forward voltage Vf of the first diode 71 relative to the potential of the first output path 61, the diode 71 allows a current to flow from the second conductive path 52 to the first output path 61, but otherwise does not allow a current to flow from the second conductive path 52 to the first output path 61.

The first switching unit 70 configured in this manner turns on the switch unit 74 during the predetermined first state (specifically, when at least the voltage of the first conductive path 51 is greater than the voltage of the second conductive path 52 by the first predetermined value or more) where the voltage of the first conductive path 51 is relatively greater than the voltage of the second conductive path 52, and supplies power from the first conductive path 51 to the first output path 61. When the switch unit 74 is on, the same voltage as that of the first conductive path 51 (a voltage larger than that of the second conductive path 52) is applied to the first output path 61, and thus a current cannot flow from the second conductive path 52 to the first output path 61. On the other hand, in a predetermined second state where the voltage of the first conductive path 51 is relatively smaller than the voltage of the second conductive path 52 (specifically, when at least the voltage of the first conductive path 51 is smaller than the voltage of the second conductive path 52), the first switching unit 70 turns off the switch unit 74 and supplies power from the second conductive path 52 to the first output path 61. When the switch unit 74 is off, the supply of power from the first conductive path 51 to the first output path 61 is blocked, and thus the voltage of the first output path 61 falls below the voltage of the second conductive path 52, and a current flows from the second conductive path 52 to the first output path 61 via the first diode 71.

The second switching unit 80 includes the second diode 82 and a third diode 83. The fourth conductive path 54 is electrically connected to the anode of the second diode 82, and a voltage that is based on the power supply unit 91 is applied thereto. The cathode of the second diode 82 is electrically connected to the second output path 62. The potential of the anode of the second diode 82 is the same as the potential of the power path 94 and the fourth conductive path 54. The potential of the cathode of the second diode 82 is the same as the potential of the second output path 62. The anode of the third diode 83 is electrically connected to the third conductive path 53. The cathode of the third diode is electrically connected to the second output path 62. The potential of the anode of the third diode 83 is the same as the potential of the third conductive path 53. The potential of the cathode of the third diode 83 is the same as the potential of the second output path 62. The second switching unit 80 treats the case where the voltage of the fourth conductive path 54 is greater than the voltage of the third conductive path 53 as the "predetermined third state", and, in this predetermined third state, supplies power from the fourth power path 54 to the second output path 62. The second switching unit 80 treats the case where the voltage of the fourth conductive path 54 is smaller than the second conductive path 52 as the "predetermined fourth state", and, in this predetermined fourth state, supplies power from the second conductive path 52 to the second output path 62. Specifically, when the voltage of the fourth conductive path 54 is greater than the voltage of the third conductive path 53, a current flows from the power path 94 and the fourth conductive path 54 to the second output path 62 via the second diode 82, and a current is blocked from flowing from the third conductive path 53 to the second output path 62. When the voltage of the third conductive path 53 is greater than the voltage of the fourth conductive path 54, a current flows from the third conductive path 53 to the second output path 62 via the third diode 83, and a current is blocked from flowing from the fourth conductive path 54 to the second output path 62.

Operations of Power Supply Switching Apparatus

In the power supply switching apparatus 5, the power control apparatus 11 performs a first switching operation, a second switching operation, and a detection operation. The first switching operation is an operation of switching between a first supply operation of supplying power that is based on the power storage unit 12 to the second conductive path 52, and a first stopping operation of stopping the supply of power from the power storage unit 12 to the second conductive path 52.

When the first supply operation is performed, the control unit 16 controls the switches 22 and 24 so that the switch 22 is turned off and the switch 24 is turned on, and causes the voltage conversion circuit 14 to perform a second conversion operation. The target value of the output voltage of the voltage conversion circuit 14 when it is performing the second conversion operation is slightly smaller than the value of the voltage applied to the power path 94 by the power supply unit 91, and is greater than the minimum voltage required for the first load 101 to operate. When the target voltage is greater than the voltage applied to the conductive path 45 by the power storage unit 12 (output voltage of the power storage unit 12), the control unit 16 performs control so as to cause the voltage conversion circuit 14 to perform a step-up operation as the second conversion operation, and to output a voltage of the target value to the conductive path 42. If the target value is smaller than the voltage applied to the conductive path 45 by the power storage unit 12 (the output voltage of the power storage unit 12), the control unit 16 performs control so as to cause the voltage conversion circuit 14 to perform a step-down operation as the second conversion operation, and to output a voltage of the target value to the conductive path 42. Note that, even if the voltage of the target value is output to the conductive path 42 according to the second conversion operation, the consumption of power from the power storage unit 12 is suppressed as long as no current flows through the diodes 71 and 84.

When the first stopping operation is performed, the control unit 16 stops the operation of the voltage conversion circuit 14, for example. At the time of the first stopping operation, the switch 22 may be off or on. At the time of the first stopping operation, the switch 24 may be off or on. Note that the first stopping operation may be an operation of causing the voltage conversion circuit 14 to operate while the switch 24 is off.

The second switching operation is an operation of switching between a second supply operation of supplying power that is based on the power storage unit 12 to the third conductive path 53, and a second stopping operation of stopping the supply of power from the power storage unit 12 to the third conductive path 53 via the discharge circuit 18.

When the second supply operation is performed, the control unit 16 performs at least one of control for turning on the switch 20 and control that causes the voltage conversion circuit 14 to output a voltage to the conductive path 47, while causing the discharge circuit 18 to perform a discharge operation. The voltage applied to the conductive path 44 and the third conductive path 53 according to the second supply operation is of a value slightly smaller than the value of the voltage applied to the power path 94 by the power supply unit 91, and is of a value that is greater than the minimum voltage required for the second load 102 to operate.

The following description is related to operations of the power supply system 3.

Figure 2:
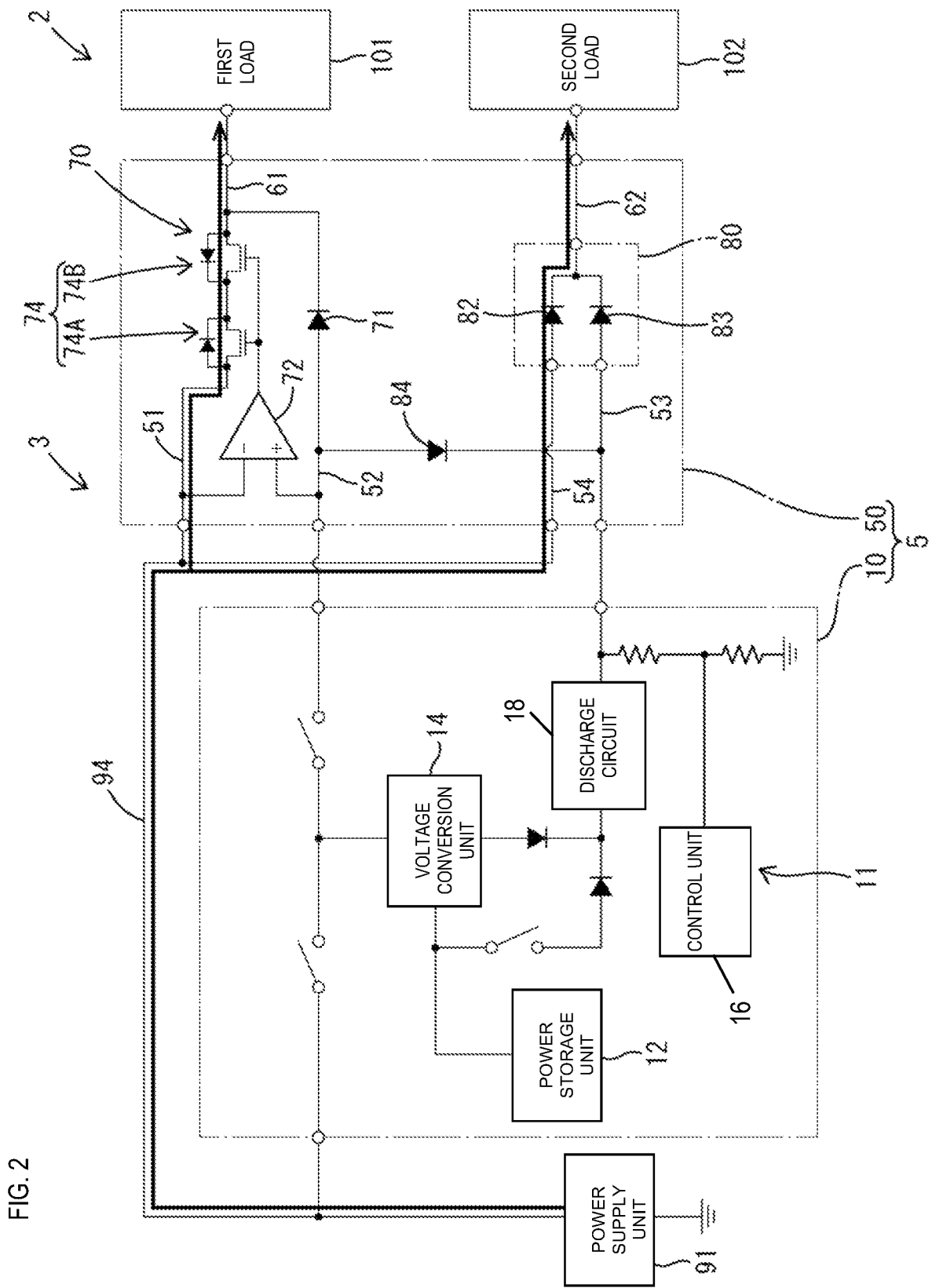
FIG. 2 is a descriptive diagram for describing a supply state of power in a state where the supply of power that is based on a power storage unit 12 is stopped in the in-vehicle system shown in FIG. 1.

The power supply system 3 applies a voltage that is based on the power supply unit 91 (for example, a voltage equal to the output voltage of the power supply unit 91) to the power path 94, the first conductive path 51, and the fourth conductive path 54, even when the vehicle in which the in-vehicle system 2 is installed is in a non-running state (when a start-up switch such as an ignition switch is off). Note that, in a non-running state, the power supply system 3 blocks paths so that power is not supplied from the power storage unit 12 to the second conductive path 52 and the third conductive path 53, and does not perform the aforementioned first supply operation or the second supply operation. In this case, the power supply system is in a normal state where an appropriate voltage that is based on the power supply unit 91 is applied to the first conductive path 51 and the fourth conductive path 54, and if the power control apparatus 11 is not performing the first supply operation and the second supply operation, power is supplied to the first output path 61 and the second output path 62 based on power from the power supply unit 91. FIG. 2 shows the power supply state in this case, and in the case of a normal state and the power control apparatus 11 performing the first supply operation and the second supply operation, power is supplied along paths shown with arrows in FIG. 2.

In the power supply system 3, when a predetermined start condition, which has been set in advance, is met, the power control apparatus 11 initiates the first supply operation and the second supply operation. The predetermined start condition may be the condition "the vehicle enters a start-up state", the condition "a certain amount of time has passed since start-up of the vehicle", the condition "the output voltage of the power storage unit 12 has reached or exceeded a predetermined value", or another condition. For example, when the vehicle in which the in-vehicle system 2 is installed enters the start-up state (a case where a start-up switch such as an ignition switch is turned on), the power control apparatus 11 determines that the predetermined start condition has been met and initiates the first supply operation and the second supply operation. Note that, in the following description, the period in which the power control apparatus 11 performs the first supply operation and the second supply operation is the normal operation period, and the period in which the power control apparatus 11 performs a later-described detection operation is a detection operation period.

Figure 3:
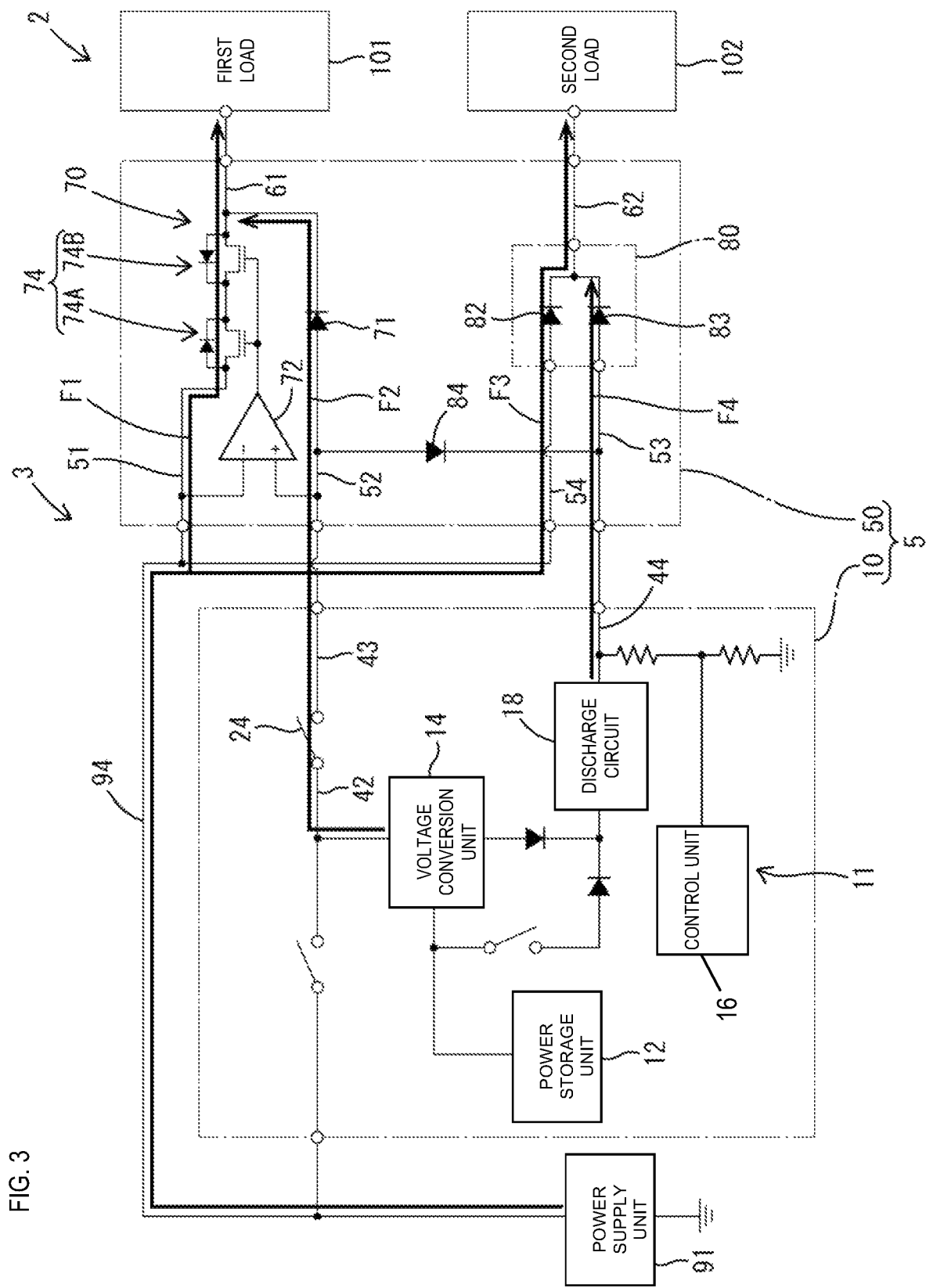
FIG. 3 is a descriptive diagram for describing the supply state of power in the state where the power supply switching apparatus is performing a first supply operation and a second supply operation in the in-vehicle system shown in FIG. 1.
Figure 4:
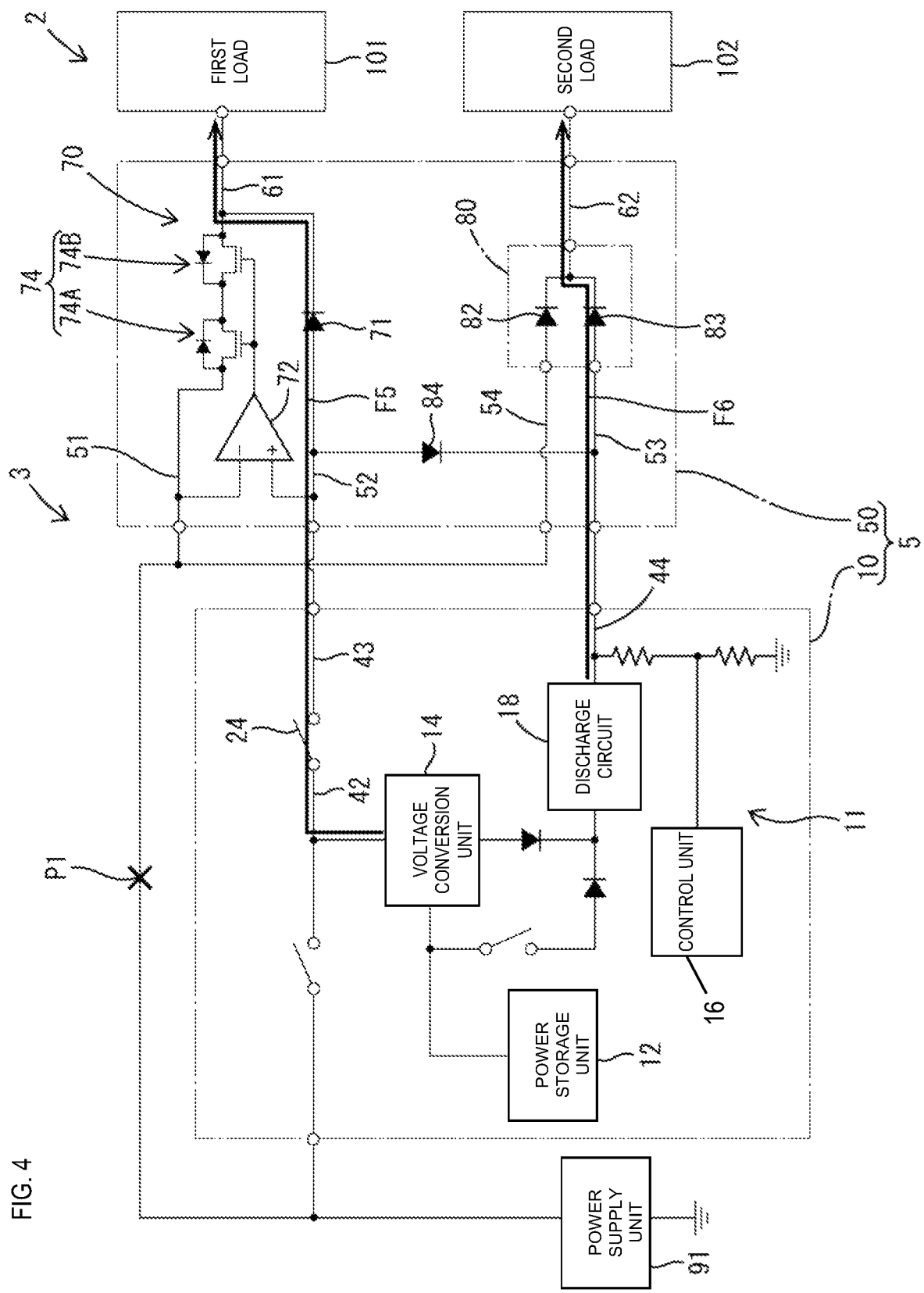
FIG. 4 is a descriptive diagram for describing the supply state of power when a power supply failure (a ground fault occurring on a power path) occurs in the in-vehicle system shown in FIG. 1.

In the normal operation period in which the power control apparatus 11 performs the first supply operation and the second supply operation, a predetermined first voltage (voltage of the target value) that is based on the first supply operation is applied to the second conductive path 52, and a predetermined second voltage that is based on the second supply operation is applied to the third conductive path 53 (a voltage that is based on discharge by the discharge circuit 18). The first voltage and the second voltage may be the same or different. In the normal operation period, if the voltage of the first conductive path 51 is greater than the voltage of the second conductive path 52, power that is based on the power supply unit 91 is supplied to the first output path 61 along a path such as that shown by the F1 arrow in FIG. 3, and if the voltage of the first conductive path 51 is smaller than the voltage of the second conductive path 52, power that is based on the power storage unit 12 is supplied to the first output path 61 along a path such as that shown by the F2 arrow in FIG. 3. Also, in the normal operation period, if the voltage of the fourth conductive path 54 is smaller than the voltage of the third conductive path 53, power that is based on the power supply unit 91 is supplied to the second output path 62 along a path such as that shown by the F3 arrow in FIG. 3, and if the voltage of the fourth conductive path 54 is smaller than the voltage of the third conductive path 53, power that is based on the power storage unit 12 is supplied to the second output path 62 along a path such as that shown by the F4 arrow in FIG. 3. Because such operations are performed, even if, for example, a short circuit occurs in the normal operation period at the position P1 shown in FIG. 4 and power that is based on the power supply unit 91 ceases to be applied to the first conductive path 51 and the fourth conductive path 54, power that is based on the power storage unit 12 is immediately supplied to the first load 101 and the second load 102 along paths such as those shown by the F5 and F6 arrows in FIG. 4. Also, in this case, both of the FETs 74A and 74B are turned off, and thus the power supplied along the path of the F5 arrow is also kept from entering the portion where the short circuit occurred.

Furthermore, the power control apparatus 11 can also perform a detection operation in a predetermined detection operation period. The detection operation period starts from when a pre-set detection start condition is met and continues until the detection operation is terminated. The detection start condition may be the condition "the start-up switch of the vehicle has been turned from off to on", the condition "a certain period of time has passed from the termination of the previous detection operation", the condition "a certain period of time has passed since start-up of the vehicle", or another condition. When the detection start condition is met, the power control apparatus 11 initiates the detection operation. The detection operation is an operation of detecting the voltage of the third conductive path 53 while the first supply operation and the second stopping operation are being performed. Specifically, in a state where the power control apparatus 11 performs the first supply operation so as to apply a predetermined voltage (voltage of the target value) to the second conductive path 52 while continuing to stop the discharge operation (second stopping operation) so that a current does not flow from the discharge circuit 18 to the conductive path 44, the voltage of the third conductive path 53 is detected by the control unit 16. The control unit 16 makes a normal determination if the voltage of the third conductive path 53 detected by the detection operation is greater than a threshold value, and makes an abnormal determination if the voltage of the third conductive path 53 detected by the detection operation is smaller than the threshold value. The threshold value used in this determination is a value that is greater than zero and smaller than the target value. In the case where an abnormal determination is made in the detection operation, the power control apparatus 11 may instruct an apparatus that has a display function or an apparatus that has a sound producing function to make a notification (for example, an abnormal display by a display device installed in the vehicle, or a sound notification using a buzzer or alarm, etc.) of the fact that an abnormal determination has been made Examples of Effects If the power that is to be supplied from the power supply unit 91 via the power path 94 is interrupted, the power supply switching apparatus 5 can use power from the power storage unit 12 to supply power to the first load 101 and the second load 102. Furthermore, in the case of the predetermined state where the voltage of the third conductive path 53 is lower than the voltage of the second conductive path 52, the power supply switching apparatus 5 allows a current to flow from the second conductive path 52 to the third conductive path 53, but otherwise blocks a current from flowing from the second conductive path 52 to the third conductive path 53. That is, whether or not the predetermined state has been entered is reflected in the third conductive path 53, and thus, if the third conductive path 53 is a monitoring target, the power supply switching apparatus 5 is advantageous in terms of monitoring the supply of power from the power storage unit 12.

As a result of the power supply switching apparatus 5 turning on the switch unit 74 when the voltage of the first conductive path 51 is greater than the voltage of the second conductive path 52, power that is based on the power supply unit 91 can be supplied to the first output path 61 while suppressing loss. On the other hand, when the voltage of the first conductive path 51 is smaller than the voltage of the second conductive path 52, the power supply switching apparatus 5 can immediately supply power that is based on the power storage unit 12 to the first output path 61 via the first diode 71.

The power supply switching apparatus 5 includes the second switching unit 80, and thus, when a power supply voltage that is based on the power supply unit 91 is relatively high (specifically, a case where the voltage of the fourth conductive path 54 is greater than the voltage of the third conductive path 53), power can be supplied to the second output path 62 based on the power supply unit 91. On the other hand, when the power supply voltage is relatively low due to a failure or the like (specifically, a case where the voltage of the fourth conductive path 54 is smaller than the voltage of the third conductive path 53), power is immediately supplied to the second output path 62 based on the power storage unit 12. The power supply switching apparatus 5 can easily realize such functions due to the provision of the second switching unit 80.

The power supply switching apparatus 5 can output power that is based on the power storage unit 12 to separate paths (the second conductive path 52 and the third conductive path 53), and can independently switch output to each path. Furthermore, this power supply switching apparatus 5 can use one path (the third conductive path 53) for both output and monitoring, and confirm whether or not output from the other path (the second conductive path 52) is being performed appropriately, and thus monitoring as to whether or not the supply of power from the power storage unit 12 is being performed appropriately can be realized with a simpler configuration.

Other Embodiments

The present disclosure is not limited to the embodiment illustrated using the above description and drawings. For example, the features of the embodiments described above and below can be combined in various ways provided that no contradiction arises. Also, any features of the embodiments described above or below can be omitted unless they are clearly described as being essential. Furthermore, the above-described embodiment may be changed in the following manner.

In the above embodiment, the power storage unit 12 is included in the power supply switching apparatus 5, but the power storage unit 12 may be provided outside of the power supply switching apparatus 5.

In the above embodiment, the first apparatus 10 is a portion of the power supply switching apparatus 5, but the first apparatus 10 may be provided external to the power supply switching apparatus 5.

In the above embodiment, the first diode 71 is illustrated as an element unit, but the element unit may be a switch that turns on when the L-level voltage signal is output from the comparator circuit 72 and allows a current to flow between the second conductive path 52 and the first output path 61, and turns off when the H-level voltage signal is output and blocks a current from flowing between the second conductive path 52 and the first output path 61.

In the above embodiment, the second switching unit 80 is illustrated as an example of the second switching unit, but the second switching unit may be configured in a similar manner to the first switching unit 70. In the above embodiment, the first switching unit 70 is illustrated as an example of the first switching unit, but the first switching unit may be configured in a similar manner to the second switching unit 80.

The embodiments disclosed herein are exemplary in all respects, and should be construed as not being restrictive. The scope of the present disclosure is indicated by the appended claims rather than the above description, and all changes that fall within the same essential spirit as the scope of the claims are intended to be included therein.

What is claimed is:

1. A power supply switching apparatus that is used to switch a power supply in a power supply system that includes a power supply unit, a power storage unit, and a power path that is a path for supplying power from the power supply unit, the power supply switching apparatus comprising:
    a first conductive path that is a path for receiving power supplied from the power path;
    a second conductive path that is a path for supplying power that is based on the power storage unit;
    a third conductive path that is a path for supplying power that is based on the power storage unit and is different from the second conductive path;
    a fourth conductive path that is a path for receiving power supplied from the power path;
    a first output path that is a path for supplying power to a first load;
    a second output path that is a path for supplying power to a second load;
    a first switching unit that is configured to supply power from the first conductive path to the first output path at the time of a predetermined first state where the voltage of the first conductive path is greater than the voltage of the second conductive path, and supply power from the second conductive path to the first output path at the time of a predetermined second state where the voltage of the first conductive path is smaller than the voltage of the second conductive path;
    a second switching unit that is configured to supply power from the fourth conductive path to the second output path at the time of a predetermined third state where the voltage of the fourth conductive path is greater than the voltage of the third conductive path, and supply power from the third conductive path to the second output path at the time of a predetermined fourth state where the voltage of the fourth conductive path is smaller than the voltage of the third conductive path; and an element unit that is configured to allow a current to flow from the second conductive path to the third conductive path in the case of a predetermined state where the voltage of the third conductive path is smaller than the voltage of the second conductive path, and otherwise block a current from flowing from the second conductive path to the third conductive path.

2. The power supply switching apparatus according to claim 1,
wherein the first switching unit includes a switch unit, a driving unit, and a blocking unit that is provided with a diode,
the switch unit is provided between the first conductive path and the first output path, and allows passage of a current between the first conductive path and the first output path when on, and blocks passage of a current between the first conductive path and the first output path when off,
the driving unit turns on the switch unit in a case where the voltage of the first conductive path is greater than the voltage of the second conductive path or in a case where the voltage of the first conductive path is greater than the voltage of the second conductive path by a first predetermined value or more, and turns off the switch unit in a case where the voltage of the first conductive path is smaller than the voltage of the second conductive path or in a case where the voltage of the first conductive path is smaller than the voltage of the second conductive path by a second predetermined value or more, and
the second conductive path is electrically connected to an anode of the diode of the blocking unit, and the first output path is electrically connected to a cathode of the diode of the blocking unit.

3. The power supply switching apparatus according to claim 2,
wherein the second switching unit includes a second diode and a third diode,
an anode of the second diode is electrically connected to the fourth conductive path, and a cathode of the second diode is electrically connected to the second output path, and
an anode of the third diode is electrically connected to the third conductive path, and a cathode of the third diode is electrically connected to the second output path.

4. The power supply switching apparatus according to claim 1, further comprising
a power control apparatus that is configured to control the supply of power from the power storage unit,
wherein the power control apparatus performs a first switching operation, a second switching operation, and a detection operation,
the first switching operation is an operation of switching between a first supply operation of supplying power that is based on the power storage unit to the second conductive path, and a first stopping operation of stopping the supply of power from the power storage unit to the second conductive path,
the second switching operation is an operation of switching between a second supply operation of supplying power that is based on the power storage unit to the third conductive path, and a second stopping operation of stopping the supply of power from the power storage unit to the third conductive path, and
the detection operation is an operation of detecting the voltage of the third conductive path while the first supply operation and the second stopping operation are being performed.

5. The power supply switching apparatus according to claim 2, further comprising
a power control apparatus that is configured to control the supply of power from the power storage unit,
wherein the power control apparatus performs a first switching operation, a second switching operation, and a detection operation,
the first switching operation is an operation of switching between a first supply operation of supplying power that is based on the power storage unit to the second conductive path, and a first stopping operation of stopping the supply of power from the power storage unit to the second conductive path,
the second switching operation is an operation of switching between a second supply operation of supplying power that is based on the power storage unit to the third conductive path, and a second stopping operation of stopping the supply of power from the power storage unit to the third conductive path, and
the detection operation is an operation of detecting the voltage of the third conductive path while the first supply operation and the second stopping operation are being performed.

6. The power supply switching apparatus according to claim 3, further comprising
a power control apparatus that is configured to control the supply of power from the power storage unit,
wherein the power control apparatus performs a first switching operation, a second switching operation, and a detection operation,
the first switching operation is an operation of switching between a first supply operation of supplying power that is based on the power storage unit to the second conductive path, and a first stopping operation of stopping the supply of power from the power storage unit to the second conductive path,
the second switching operation is an operation of switching between a second supply operation of supplying power that is based on the power storage unit to the third conductive path, and a second stopping operation of stopping the supply of power from the power storage unit to the third conductive path, and
the detection operation is an operation of detecting the voltage of the third conductive path while the first supply operation and the second stopping operation are being performed.

* * * * *